(12) United States Patent
Nielsen

(10) Patent No.: US 9,533,441 B2
(45) Date of Patent: Jan. 3, 2017

(54) METHOD OF MANUFACTURING A PACKAGING WITH IML BARRIER FILM IN COMBINATION WITH OXYGEN SCAVENGER

(75) Inventor: Benny E. Nielsen, Kalundborg (DK)

(73) Assignee: Superfos A/S, Taastrup (DK)

( * ) Notice: Subject to any disclaimer, the term of this patent is extended or adjusted under 35 U.S.C. 154(b) by 0 days.

(21) Appl. No.: 12/452,516

(22) PCT Filed: Nov. 7, 2008

(86) PCT No.: PCT/EP2008/059113
§ 371 (c)(1),
(2), (4) Date: Mar. 30, 2010

(87) PCT Pub. No.: WO2009/007453
PCT Pub. Date: Jan. 15, 2009

(65) Prior Publication Data
US 2010/0193389 A1    Aug. 5, 2010

(30) Foreign Application Priority Data
Jul. 12, 2007   (EP) .................................... 07388053

(51) Int. Cl.
*B29C 45/16*   (2006.01)
*B29C 45/14*   (2006.01)
(Continued)

(52) U.S. Cl.
CPC ........... *B29C 45/1671* (2013.01); *B29C 45/14* (2013.01); *B29C 45/1642* (2013.01);
(Continued)

(58) Field of Classification Search
None
See application file for complete search history.

(56) References Cited

U.S. PATENT DOCUMENTS 5,399,289 A * 3/1995 Speer et al. ............. 252/188.28
5,800,887 A * 9/1998 Koyama ..................... 428/36.7
(Continued)

FOREIGN PATENT DOCUMENTS

DE    102005045621    4/2007
EP        0778209    6/1997
(Continued)

OTHER PUBLICATIONS

Machine Translation of JP 10-129737, Feb. 13, 2013.*
(Continued)

*Primary Examiner* — Benjamin Schiffman
(74) *Attorney, Agent, or Firm* — Dykema Gossett PLLC

(57) ABSTRACT

A packaging article for containing and holding food products includes a barrier layer for limiting permeability of oxygen through and into the article and an oxygen scavenging layer, which oxygen scavenging layer together with a second plastic material is contained within a cavity in a first plastic material forming walls, bottom(s) and lid(s) of the packaging article, which first plastic material is suitable for contact with food products. A method of manufacturing a packaging finished in one injection molding cycle includes placing the barrier layer in a mold, injecting the first plastic material suitable for contact with food products into the mold, and injecting the second plastic material with the oxygen scavenger into the mold.

7 Claims, 2 Drawing Sheets

(51) Int. Cl.
  *B32B 27/08* (2006.01)
  *B65D 25/20* (2006.01)
  *B65D 25/36* (2006.01)
  *B65D 65/40* (2006.01)
  *B65D 81/26* (2006.01)
  *B32B 27/30* (2006.01)
  *B32B 27/34* (2006.01)
  *B29L 31/00* (2006.01)

(52) U.S. Cl.
  CPC .......... *B29C 45/1679* (2013.01); *B32B 27/08* (2013.01); *B32B 27/306* (2013.01); *B32B 27/34* (2013.01); *B65D 25/205* (2013.01); *B65D 25/36* (2013.01); *B65D 65/40* (2013.01); *B65D 81/266* (2013.01); *B29C 2045/14918* (2013.01); *B29C 2045/167* (2013.01); *B29L 2031/712* (2013.01); *B32B 2307/7244* (2013.01); *B32B 2307/7248* (2013.01); *B32B 2307/74* (2013.01); *B32B 2439/70* (2013.01); *B65D 2565/387* (2013.01); *Y02W 30/806* (2015.05)

(56) References Cited

U.S. PATENT DOCUMENTS

| | | | |
|---|---|---|---|
| 5,914,138 A * | 6/1999 | Swenson | 425/130 |
| 6,475,579 B1 | 11/2002 | Slat | |
| 6,586,514 B2 * | 7/2003 | Chiang et al. | 524/417 |
| 7,803,305 B2 * | 9/2010 | Ahern et al. | 264/328.8 |
| 2003/0091769 A1 | 5/2003 | Slat et al. | |
| 2005/0037165 A1* | 2/2005 | Ahern et al. | 428/35.7 |
| 2009/0281516 A1* | 11/2009 | Ahern et al. | 604/415 |
| 2011/0123414 A1* | 5/2011 | Ahern et al. | 422/550 |

FOREIGN PATENT DOCUMENTS

| | | |
|---|---|---|
| JP | 05301249 | 11/1993 |
| JP | 09174595 | 7/1997 |
| JP | 10129737 A * | 5/1998 |
| WO | 02102571 | 12/2002 |

OTHER PUBLICATIONS

English Abstract of JP 9174595.
English Abstract of DE 102005045621.
English Abstracct of JP 5301249.

\* cited by examiner

METHOD OF MANUFACTURING A PACKAGING WITH IML BARRIER FILM IN COMBINATION WITH OXYGEN SCAVENGER

BACKGROUND OF THE INVENTION

Field of the Invention

The invention relates to a packaging article for containing and holding food products, which article comprises one or more chambers defined by walls, bottom(s) and lid(s) where the walls, bottom(s) and lid(s) have barrier means for limiting permeability of oxygen through the article and into the one or more chambers and comprising an oxygen scavenger in at least the walls, bottom(s) or lid(s).

The invention further relates to a method of manufacturing a packaging article for containing and holding food products, which article comprises one or more chambers defined by walls, bottom(s) and lid(s) where the walls, bottom(s) and lid(s) have barrier means for limiting permeability of oxygen through the article and into the one or more chambers.

The Prior Art

It is known to produce articles for containing food products from different types of plastic. Plastics are relatively easy to mould into a desired configuration.

It is also known to produce articles for containing food products from plastic sheet, film or laminated film.

The plastic sheets or film are made in an extrusion process. The sheet or film material is converted into plastic bags or trays which can be filled with oxygen-sensitive food.

These types of trays or containers do not leave the manufacturer much liberty of producing or designing a more welcoming appearance as well as the possibility of puncture of the sheet or film exists and thereby significantly shortening the storage life of the food product, sometimes even without the puncture being noticed.

Therefore it is desirable to be able to manufacture a packaging article with greater liberty of producing or designing and a more welcoming appearance together with a more stable structure preventing unintended puncturing of parts of the packaging article.

This can be done by injection moulding the packaging article from a polypropylene which gives fine results with regards to designing and a more welcoming appearance as well as an article more resistant for instance to punctures. Unfortunately, the oxygen permeability for polypropylene is not satisfactory. When used in combination with food products, it is advantageous to have a packaging article with adequate barrier properties.

To give polypropylene better properties with respect to forming an oxygen barrier, another material has been added to the polypropylene before moulding. A material such as ethylene vinyl alcohol (EVOH) has been used to achieve the desired barrier properties. Other barrier materials could be $SiOx$, a coating of PVDc or a compound of a special nylon such as MXD6 mixed into the basis material.

Further, polypropylene makes it possible to perform a heat treatment of the food product placed in the packaging article, which is not possible with all plastics.

Oxygen contained in the interior of the packaging article together with a food product is unwanted, since the oxygen contributes to the putrefaction of the food product.

To avoid such a situation or ensure a better storage life of the food product kept in the packaging article, different methods have been tested. One method is to put an oxygen scavenger into the packaging article, either by simply putting an oxygen-scavenging member into the package together with the food product or by adding the oxygen scavenger to the plastic material used to manufacture the packaging article.

An oxygen scavenger is a substance or material capable of absorbing oxygen by a chemical reaction and thereby able to remove or reduce the content of oxygen from an enclosure.

US 2003/0091769 A1 describes a multilayer preform and container with coextruded liner. Here, the packaging article is manufactured as a multilayer preform, where one or more of the layers comprise an oxygen scavenger.

The problem arising when using a preform to manufacture an article is that the preform probably will be stored for a longer period. If nothing is done to prohibit the oxygen scavenger from starting its oxygen-absorbing reaction, it is possible that the scavenging action will not be sufficient at the time the preform is moulded into its final shape and ready to be filled with for example beverages.

To prevent this reaction from starting before the scavenging property is needed, the scavenger can be sandwiched between at least two barrier layers.

New Technique

To provide a packaging article with a more welcoming appearance and a greater liberty of producing such trays or containers together with improved scavenging and barrier properties, a new tray or container for food products and a new method of manufacturing such a tray or container are developed. This is achieved by the invention by providing a packaging article that comprises oxygen-scavenging means, which oxygen-scavenging means together with a second plastic material is moulded into a cavity in a first plastic material forming walls, bottom(s) and lid(s) of the packaging article, which first plastic material is suitable for contact with food products.

The first and second plastic materials are in most cases different plastic materials, but it is possible to use the same plastic material as both first and second material. The advantage of using a different plastic material as the second plastic material is that it is not necessary to use a plastic material suitable for contact with food products, since the second plastic material is embedded in or surrounded by the first plastic material.

Further, a method of manufacturing such a packaging article is developed.

This method is an expedient way of manufacturing a packaging article according to the invention.

This is achieved by placing an In-Mould-Label film (IML film) with a barrier film or coating in an injection mould and thereafter injecting a polypropylene into the mould. The polypropylene is injected into the mould in such a way that an oxygen scavenger is surrounded by polypropylene material and the oxygen scavenger is situated on the inner side of the In-Mould-Label, but not necessarily adjacent to the In-Mould-Label.

By the method the article in the form of a high barrier packaging is finished in one injection moulding cycle comprising the following three process steps:

An oxygen barrier film with or without decoration is placed in the mould.

A first plastic material suitable for contact with food products is injected into the closed mould where the barrier film is placed. The mould is partly filled in this step.

A second plastic material containing an oxygen scavenger (3) is injected into the mould until the mould is filled, whereby the oxygen scavenger (3) is surrounded by the first plastic material (2) suitable for contact with food products.

This method using In-Mould-Labelling technology makes the oxygen barrier film an integrated part of the injection moulded packaging, where the injected plastic is forming a sandwich structure with a layer of a second plastic material containing an oxygen scavenger sealed between two layers of a first plastic material intended for contact with food products.

When the first plastic material, which is a kind of polypropylene, is injected into the mould, the outer part of the plastic material is cooled by contact with the inner surfaces of the mould and the part of the plastic material pointing in the direction away from the inner surfaces (the inner part of the mould cavity) is still flowing through the mould. This action can be described as "rolling out a carpet" on both sides of the material at a time.

Since the IML film is placed in the mould before injecting the polypropylene, the polypropylene will attach to the IML film during partly filling the mould.

After this step a cavity in the polypropylene is achieved, which cavity is filled with a second plastic material comprising an oxygen scavenger.

Hereby a high barrier plastic packaging is achieved, which is made by injection moulding. This type of packaging combines the excellent barrier properties in film and sheet material with the high quality and design freedom of injection moulded packaging and comprising an oxygen scavenger.

This method using In-Mould-Labelling technology makes the barrier film an integrated part of the injection moulded packaging, where the injected plastic is forming an inner side intended for contact with food products and with the external side formed of an In-Mould-Label. Further, the oxygen scavenger is embedded in the polypropylene in such a way that the scavenger is not in direct contact with the food products contained in the packaging article in use.

A suitable material for the barrier as mentioned previously could be EVOH.

According to an embodiment of the invention, an effective oxygen-scavenging high barrier packaging article is provided by having oxygen scavenging means moulded into the inner part of the walls, bottom(s) or lid(s) of the packaging article.

According to an embodiment of the invention, an effective oxygen-scavenging high barrier packaging article is provided by having a packaging article, which on its outer side is provided with barrier properties by In-Mould-Labelling a label comprising a barrier film together with injection moulding the packaging article from a polypropylene.

According to an embodiment of the invention, a high barrier packaging article is provided where the barrier means is embedded in the label.

According to an embodiment of the invention, a high barrier packaging article is provided where the barrier means is chosen from a group consisting of silicium oxide (SiOx) or a coating of silicium oxide (SiOx), a coating of PVDc, a special nylon such as MXD6 mixed into the basis material or of EVOH (ethyl-vinyl-alcohol).

According to an embodiment of the invention, a high barrier packaging article is provided where the barrier surrounds most of or the entire outer area or surface of the packaging article.

According to the invention, a packaging article with embedded oxygen-scavenging means is made in one injection moulding cycle consisting of three process steps.

According to an embodiment of the invention, a packaging article with oxygen scavenging means is made by mixing an oxygen-scavenging material in a plastic material before injecting this mixture into a partly moulded packaging article.

BRIEF DESCRIPTION OF THE DRAWINGS

Embodiments will now be discussed in further detail with reference to the accompanying drawings in which.

DETAILED DESCRIPTION OF THE PREFERRED EMBODIMENTS

Figure 1:
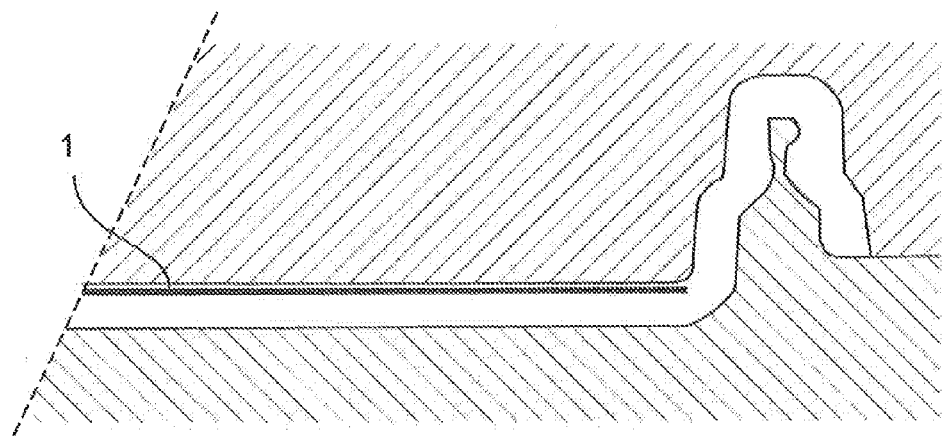
FIG. 1 schematically shows an In-Mould-Label positioned in a mould.
Figure 2:
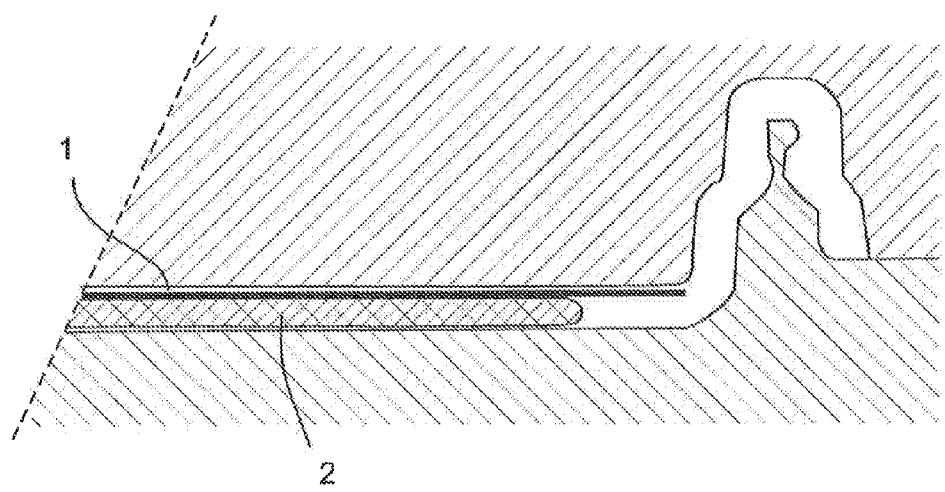
FIG. 2 schematically shows a first plastic material flowing into the mould during injection, FIG. 3 schematically shows an oxygen scavenger flowing into the middle part of the first plastic material during injection, and FIG. 4 schematically shows the first plastic material surrounding the oxygen scavenger and completely filling the mould.
Figure 3:
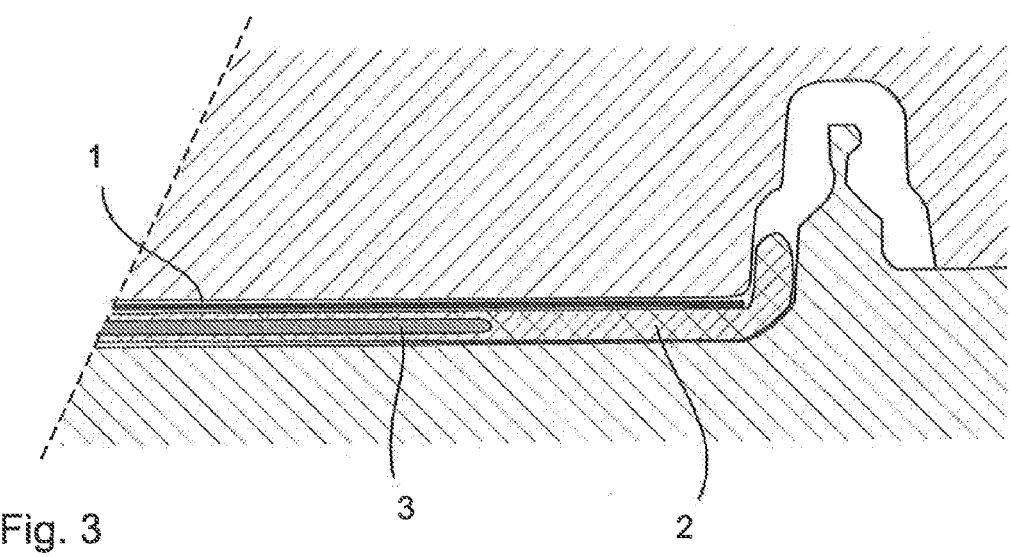
Figure 4:
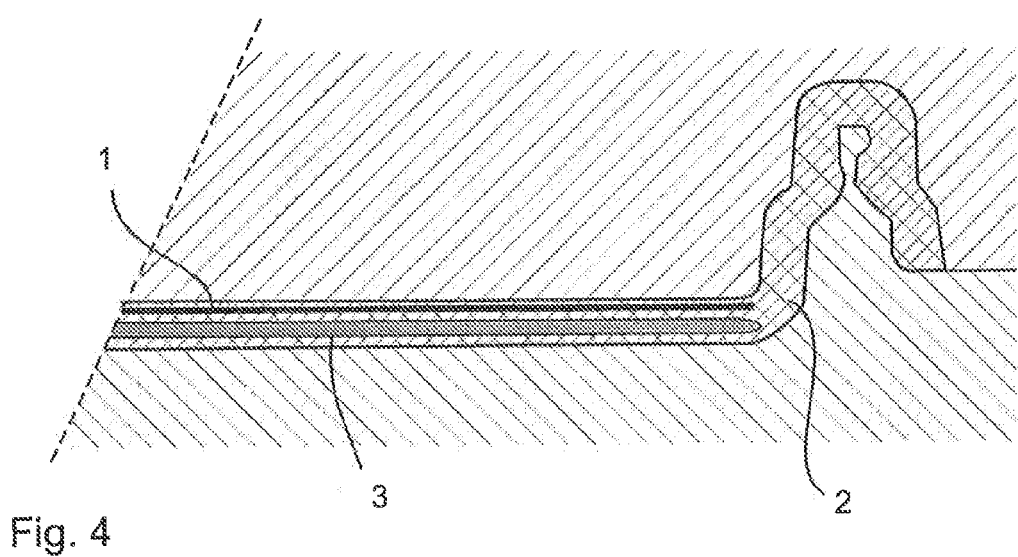

The drawings show in principle how a lid according to an embodiment of the invention is manufactured. The invention is not limited to a lid but also comprises other parts of the packaging article in such a way that it is possible to manufacture a packaging article with sufficient oxygen-scavenging means 3 to reduce or completely remove oxygen from the inside of the packaging article. Besides, barrier means 1 inhibits oxygen from permeating from the surrounding air (atmosphere) and into the package.

In general the article is manufactured by placing an In-Mould-Label film (IML film) 1 including a barrier film in an injection mould and thereafter injecting a polypropylene 2 into the mould.

Hereby is achieved a high barrier plastic packaging, which is made by injection moulding. This type of packaging combines the excellent barrier properties in film and sheet material with the high quality and design freedom of injection moulded packaging.

The high barrier packaging is finished in one injection moulding cycle consisting of three process steps:

An oxygen barrier film 1 with or without decoration is placed in the mould.

A first plastic material 2 suitable for contact with food products is injected into the closed mould where the barrier film 1 is placed. The mould is partly filled in this step.

A second plastic material containing an oxygen scavenger 3 is injected into the mould until the mould is filled, whereby the oxygen scavenger 3 is surrounded by the first plastic material 2 suitable for contact with food products.

This method using In-Mould-Labelling technology makes the oxygen barrier film or coating 1 an integrated part of the injection moulded packaging, where the injected plastic 2 is forming a sandwich structure with a layer of a second plastic material containing an oxygen scavenger 3 sealed between two layers of a first plastic material 2 intended for contact with food products. Hereby an oxygen scavenger 3 is embedded in and surrounded by the first plastic material 2.

In one embodiment of the invention the article is manufactured by placing an In-Mould-Label film (IML film) 1 with an oxygen barrier film in an injection mould and thereafter injecting a polypropylene 2 into the mould.

The barrier means 1 inhibits or reduces the oxygen from the outside atmosphere from contacting the oxygen scavenger 3 and thereby prevents oxygen from the outside atmosphere using up the oxygen scavenger 3.

If the heat treatment takes place at very high temperatures, the barrier means 1 to be chosen depends on the physical behaviour and strength of the barrier material and on the specific material to which the barrier is coated or in which the barrier is laminated or in other way embedded.

In such cases where heat treatment of the food products takes place at very high temperatures a kind of silicium oxide (SiOx) can be used as barrier. Silicium oxide (SiOx) by the way does not have the same high barrier properties as EVOH (ethylene vinyl alcohol) why EVOH is preferable if high barrier properties are necessary.

A further advantage of combining an embedded scavenger in a packaging article together with an oxygen barrier is that when processed food products placed in the packaging article are exposed to heat treatment, the barrier means can change their barrier properties during or just following the heat treatment. The heat treatment can be carried out by autoclaving.

As an example EVOH will loose a rather significant amount of its barrier properties during or just after heat treatment has taken place the combination of an oxygen scavenger embedded in the packaging article, and on oxygen barrier (in this example EVOH) ensures that the oxygen that passes through the barrier due to the temporary lowered barrier properties will be absorbed by the oxygen scavenger until the barrier means recovers the original barrier properties.

Thereby the food product contained in the packaging article will be given a more ideal start of a storing life.

The barrier properties are to be chosen on the basis of the oxygen scavenging properties of the oxygen scavenger 3 and in relation to the type of food products to be kept in the packaging article. Further, a parameter to choose a suitable barrier 1 and a suitable oxygen scavenger 3 is the storage time of the food product kept in the packaging article.

In a further embodiment the barrier film is embedded in the IML film 1 thereby preventing the barrier film 1 from unintentional damaging.

Further, it is possible relative to the state of the art to obtain a more well-defined barrier function with the packaging article if the barrier 1 is supplied as a laminated label or film, which is moulded to the packaging article in an "In-Mould-Labelling" process.

In yet another embodiment the barrier film 1 is embedded in a label by laminating.

It is obvious that the packaging article can comprise more than one chamber/compartment and possibly one or more lids or lid-portions.

Other possible barrier materials could be silicium oxide (SiOx), a coating of PVDc or a compound of a special nylon, such as MXD6 mixed into the basis material. These materials or other materials can be used as long as the barrier properties are sufficient. A barrier of EVOH has been tested and gives satisfactory effective barrier properties.

To obtain the best results for protecting the products to be kept in the packaging article from an excessive amount of oxygen the aim is to manufacture the packaging article with one or more barriers, which barriers will cover almost the entire outer area or surface of the packaging article. The barrier means covers approximately 90% of the entire outer area or surface of the packaging article, preferably 95-100% and more preferably 100% of the entire outer area or surface of the packaging article.

In a further embodiment addition of different types of nanoclay or mineral fillers, such as for example talcum or chalk, to the polypropylene 2 can reduce the permeability of the polypropylene against oxygen in such a way that if the scavenger is exhausted, better barrier properties are remaining, compared to polypropylene without addition of nanoclay or mineral fillers.

The oxygen scavenger can be added to the second plastic material to be mould into the cavity as a master batch in the feed hopper in the injection moulding machine similar to the method of adding colour or antistatic agent to an injection moulded article.

It is obvious that the first and second plastic materials are in most cases different plastic materials, but it is possible to use the same plastic material as both first and second material. The advantage of using a different plastic material as the second plastic material is that it is not necessary to use a plastic material suitable for contact with food products, since the second plastic material is embedded in or surrounded by the first plastic material.

The scavenger master batch comprises the essential active substances mixed into a material, which material is mixable with the plastic material used to manufacture the packaging article.

A suitable scavenger can comprise iron powder, ascorbic acid or polymers with cyclic allylic groups.

The invention is not limited to the use of the mentioned barrier films and/or coatings as well as the mentioned scavenging materials since any suitable materials can be used as long as they fulfill the properties described herein.

The invention claimed is:

1. A method of manufacturing a packaging article for food products, said packaging article having an outer surface and an inner surface, said method comprising the steps of:
   (a) providing an injection mold configured to form the packaging article,
   (b) placing a film of oxygen barrier material in the mold,
   (c) injecting a first plastic material into the mold so as to partially fill the mold on an inner side of the oxygen barrier film, the first plastic material being suitable for contact with food products,
   (d) injecting a second plastic material containing an oxygen scavenger into the mold so as to become embedded in the first plastic material and concurrently cause the first plastic material to fill the mold, said first plastic material with second plastic material embedded therein forming an inner wall of the packaging article, and
   (e) removing the packaging article from the mold,
   said packaging article including an outer film of oxygen barrier material and an inner wall containing an oxygen scavenger material.

2. The method according to claim 1, wherein said first plastic material comprises polypropylene.

3. The method according to claim 1, wherein the second plastic material comprises polypropylene.

4. The method according to claim 1, wherein the oxygen scavenger comprises iron powder.

5. The method according to claim 1, wherein the oxygen scavenger comprises ascorbic acid.

6. The method according to claim 1, including a step of mixing the oxygen scavenger with the second plastic material prior to injecting the second plastic material containing an oxygen scavenger into the mould.

7. The method according to claim 1, wherein the oxygen barrier film comprises ethylvinyl alcohol.

\* \* \* \* \*